United States Patent
Watanabe

(10) Patent No.: US 8,310,572 B2
(45) Date of Patent: Nov. 13, 2012

(54) COMPUTER READABLE STORAGE MEDIUM, IMAGE CORRECTION APPARATUS, AND IMAGE CORRECTION METHOD

(75) Inventor: Masahiro Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 12/923,387

(22) Filed: Sep. 17, 2010

(65) Prior Publication Data

US 2011/0013047 A1    Jan. 20, 2011

Related U.S. Application Data

(63) Continuation of application No. PCT/JP2008/072042, filed on Dec. 4, 2008.

(30) Foreign Application Priority Data

Mar. 18, 2008 (JP) ................. 2008-070174

(51) Int. Cl.
   *H04N 5/225* (2006.01)
   *H04N 5/228* (2006.01)
   *H04N 5/20* (2006.01)
   *G06K 9/40* (2006.01)

(52) U.S. Cl. ................. 348/255; 348/207.1; 348/222.1; 382/274

(58) Field of Classification Search ............. 348/207.1, 348/207.2, 222.1, 254–6; 382/274
See application file for complete search history.

(56) References Cited

U.S. PATENT DOCUMENTS

| 7,010,160 | B1 * | 3/2006 | Yoshida | 382/162 |
| 8,004,511 | B2 * | 8/2011 | Kerofsky | 345/211 |
| 8,035,728 | B2 * | 10/2011 | Subbotin et al. | 348/364 |
| 8,103,119 | B2 * | 1/2012 | Kuniba | 382/274 |
| 2004/0109614 | A1 | 6/2004 | Enomoto et al. | |
| 2005/0231605 | A1 | 10/2005 | Nakami et al. | |

FOREIGN PATENT DOCUMENTS

| JP | 11-261822 | 9/1999 |
| JP | 2004-145287 | 5/2004 |
| JP | 2005-33504 | 2/2005 |
| JP | 2005-62993 | 3/2005 |
| JP | 2007-295542 | 11/2007 |
| WO | 2004/008754 A1 | 1/2004 |

OTHER PUBLICATIONS

International Search Report for PCT/JP2008/072042, mailed Mar. 3, 2009.

* cited by examiner

*Primary Examiner* — Daniel M Pasiewicz
(74) *Attorney, Agent, or Firm* — Staas & Halsey LLP

(57) ABSTRACT

An image correction apparatus includes an exposure-level calculating unit that calculates an exposure level using information on an image capturing unit, which captures image data, at the time of capture of an image, a brightness calculating unit that calculates brightness of the image using information on the image data captured by the image capturing unit, and an image correction unit that corrects the brightness of the image data in accordance with the exposure level calculated by the exposure-level calculating unit and the brightness of the image calculated by the brightness calculating unit.

12 Claims, 5 Drawing Sheets

FOR WEAK BRIGHTNESS CONVERSION

FOR STRONG BRIGHTNESS CONVERSION

FOR DARKNESS CONVERSION

NIGHT SCENE IMAGE
TAKEN AT SLOW SHUTTER SPEED, E.G., EV=1 (LOW EV)
⇒CANNOT BRIGHTNEN IMAGE, LEAVE IMAGE AS IT IS

UNDEREXPOSED FAILED IMAGE
TAKEN AT FAST SHUTTER SPEED, E.G., EV=15 (HIGH EV)
⇒WISH TO BRIGHTEN IMAGE

COMPUTER READABLE STORAGE MEDIUM, IMAGE CORRECTION APPARATUS, AND IMAGE CORRECTION METHOD

CROSS-REFERENCE TO RELATED APPLICATION(S)

This application is a continuation of International Application No. PCT/JP2008/072042, filed on Dec. 4, 2008 which claims the benefit of priority from Japanese Patent Application No. 2008-070174, filed on Mar. 18, 2008, the entire contents of which are incorporated herein by reference.

FIELD

The embodiments discussed herein are directed to a computer readable storage medium, an image correction apparatus, and an image correction method for performing a correction process on image data.

BACKGROUND

A typical correction process that is performed on image data captured with a digital camera is known. For example, if captured image data is dark image data due to underexposure, a brightness conversion is performed as a correction process to convert the dark image into a brighter image.

However, if the dark image data is image data of a night scene, the image is naturally dark. In some cases, however, a naturally dark image may possibly be erroneously made brighter as if it is an image taken during daytime.

Accordingly, a technology is known for correcting, by using exposure correction level (e.g., exposure shift level of a camera determined by a user), the degree of automatic correction in order to control the correction process performed on image data (see Japanese Laid-open Patent Publication No. 2005-62993, International Publication Pamphlet No. WO 2004/008754, and Japanese Laid-open Patent Publication No. 2007-295542). For example, using the exposure shift level of a camera determined by the user, the degree of correction for the image data is controlled, depending on whether it is of an underexposed failed image or a night scene image, by presuming and specifying the conditions under which the image of the subject is captured.

With the technology for controlling the correction process performed on the image data described above, the degree of automatic correction is corrected using an exposure correction level. Accordingly, for example, if a user erroneously determines an exposure correction level or sets an exposure correction level to a fixed state, the conditions under which the image of the subject is captured may not be presumed or specified from the exposure correction level. Thus, it is difficult to determine an appropriate automatic correction level. Because of this, there is a problem in that it is not possible to perform a correction process on image data in a precise manner.

SUMMARY

According to an aspect of embodiments of the invention, a computer readable storage medium has stored therein an image correction program. The image correction program causes a computer to execute a process including: firstly calculating an exposure level using information on an image capturing unit, which captures image data, at the time of capture of an image; secondly calculating brightness of the image using information on the image data captured by the image capturing unit; and correcting the brightness of the image data in accordance with the exposure level calculated in the firstly calculating and the brightness of the image calculated in the secondly calculating.

According to another aspect of embodiments of the invention, an image correction apparatus includes: an exposure-level calculating unit that calculates an exposure level using information on an image capturing unit, which captures image data, at the time of capture of an image; a brightness calculating unit that calculates brightness of the image using information on the image data captured by the image capturing unit; and an image correction unit that corrects the brightness of the image data in accordance with the exposure level calculated by the exposure-level calculating unit and the brightness of the image calculated by the brightness calculating unit.

According to still another aspect of embodiments of the invention, an image correction method includes: firstly calculating an exposure level using information on an image capturing unit at the time of capture of an image; secondly calculating brightness of the image using information on image data captured by the image capturing unit; and correcting the brightness of the image data in accordance with the exposure level calculated in the firstly calculating and the brightness of the image calculated in the secondly calculating.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENT(S)

Preferred embodiments of the present invention will be explained with reference to accompanying drawings.

[a] First Embodiment

In the following embodiment, the configuration of an image correction apparatus according to a first embodiment and the flow of processing thereof are described in this order. Finally, an advantage of the first embodiment will be described. In the following, a case in which image data captured with a digital camera is corrected by the image correction apparatus and the corrected data is output to a printer connected thereto will be described.

Configuration of the image correction apparatus

Figure 1:
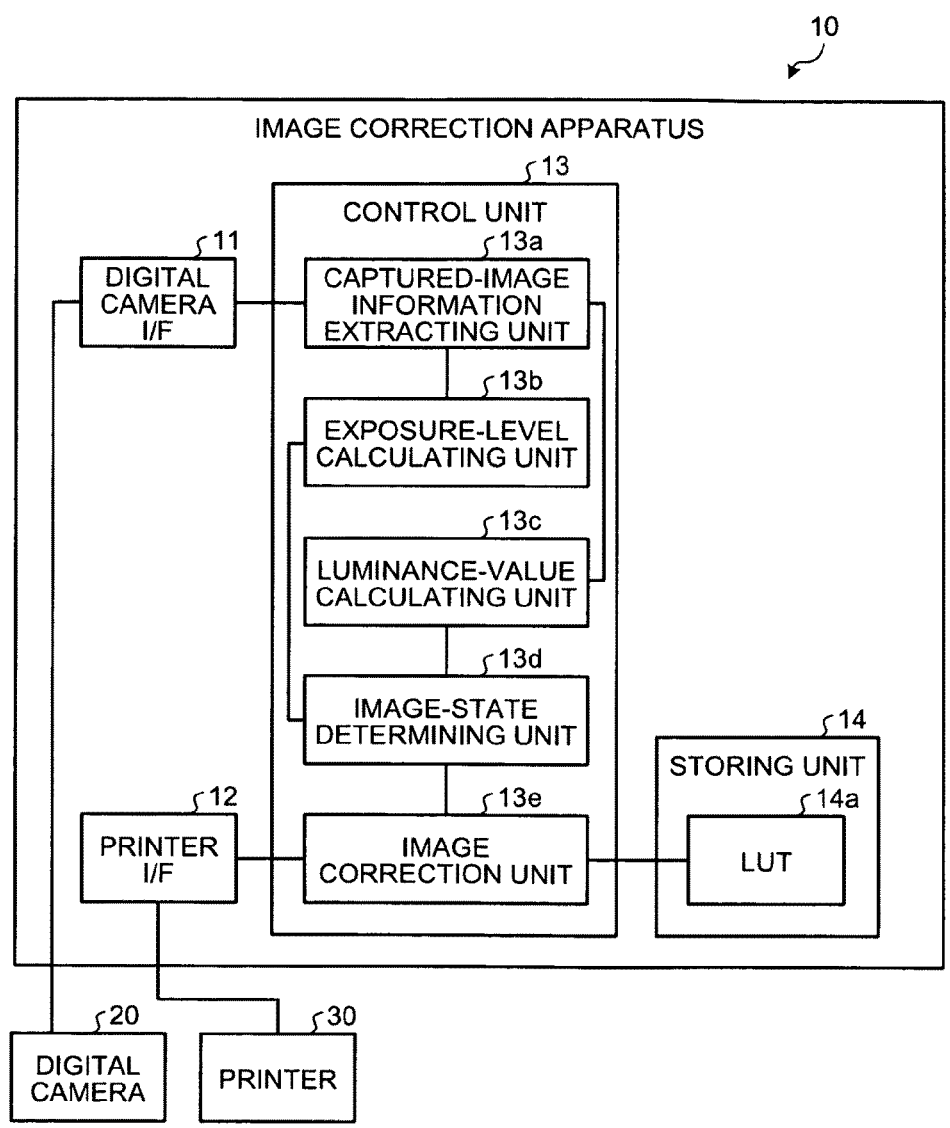
FIG. 1 is a block diagram illustrating the configuration of an image correction apparatus according to a first embodiment.

In the following, the configuration of an image correction apparatus 10 according to the first embodiment will be described with reference to FIG. 1. FIG. 1 is a block diagram illustrating the configuration of the image correction apparatus 10 according to the first embodiment. As illustrated in FIG. 1, the image correction apparatus 10 includes a digital camera I/F 11, a printer I/F 12, a control unit 13, and a storing unit 14. The image correction apparatus is connected to a digital camera 20 and a printer 30 via a cable or a network. Processes performed by these units will be described below.

The digital camera I/F 11 controls communication of various kinds of information exchanged with the digital camera 20 connected thereto. Specifically, the digital camera I/F 11 receives captured image data from the digital camera 20.

The printer I/F 12 controls the communication of various kinds of information exchanged with the printer 30 connected thereto. Specifically, the printer I/F 12 sends, to the printer 30, image data subjected to a correction process.

Figure 2A:
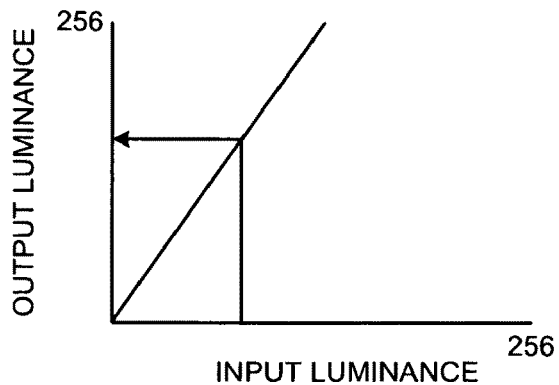
FIGS. 2A to 2C are schematic diagrams explaining a look up table.
Figure 2B:
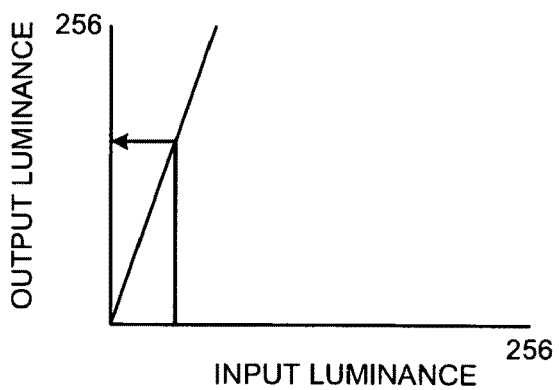
Figure 2C:
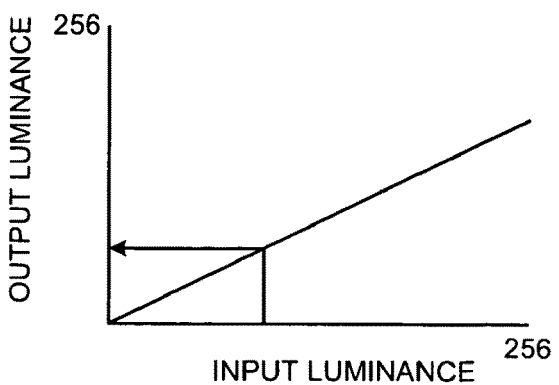

The storing unit 14 stores therein data and programs for various kinds of processes performed by the control unit 13. The storing unit 14 includes a look up table (hereinafter, referred to as an LUT) 14a, which is particularly and closely related to the present invention. As illustrated in FIGS. 2A to 2C, the LUT 14a is a conversion table representing the correlation between luminance values of an input image and luminance values of an output image.

As in the example illustrated in FIGS. 2A to 2C, the LUT 14a contains a plurality of conversion tables: brightness conversion LUTs that are used to make the luminance value of an output luminance greater than that of the input luminance (see FIGS. 2A and 2B) and a darkness conversion LUT that is used to make the luminance value of an output luminance lower than that of the input luminance (see FIG. 2C). In this case, the LUT 14a contains, as a brightness conversion LUT, a weak brightness conversion LUT that is used to perform weak brightness conversion (see FIG. 2A) and a strong brightness conversion LUT that is used to perform strong brightness conversion (see FIG. 2B).

The control unit 13 has an internal memory for storing data and programs prescribing various kinds of procedures, whereby various kinds of processes are executed. The control unit 13 includes a captured-image information extracting unit 13a, an exposure-level calculating unit 13b, a luminance-value calculating unit 13c, an image-state determining unit 13d, and an image correction unit 13e, which are particularly and closely related to the present invention.

The captured-image information extracting unit 13a extracts, from captured-image data that is received from the digital camera, information on the digital camera 20 at the time of image capturing and information on the image data. For example, the captured-image information extracting unit 13a extracts, from the captured-image data, "Exif information" that includes information on the shutter speed, the aperture stop, and the ISO (sensitivity of the image-acquisition device) at the time of image capturing with the digital camera 20 and "pixel data" that includes luminance value data corresponding to the number of pixels and RGB pixel data. Then, the captured-image information extracting unit 13a sends the "Exif information" to the exposure-level calculating unit 13b and sends the "pixel data" to the luminance-value calculating unit 13c, both of which will be described later.

The exposure-level calculating unit 13b calculates, using information stored in the digital camera 20 at the time of image capturing, an exposure level (EV). For example, the exposure-level calculating unit 13b calculates, from Exif information using Equation (1), an exposure level (EV) and notifies the image-state determining unit 13d, which will be described later. The EV is represented as a function of F (aperture), T (shutter speed), and ISO (sensitivity).

$$EV = \log(F^2) - \log(T) - (\log(ISO/100)) \quad (1)$$

Figure 3:
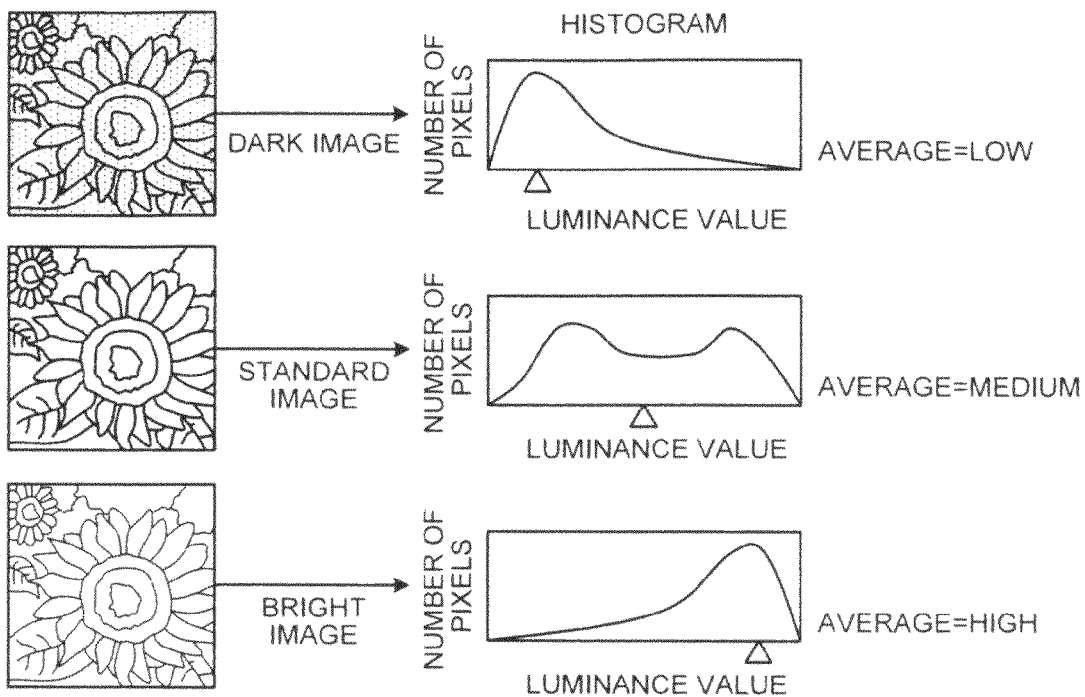
FIG. 3 is a schematic diagram explaining a process for calculating the average value of the brightness of an image.

The luminance-value calculating unit 13c calculates, using information on image data, the brightness of an image. Specifically, as illustrated in FIG. 3, the luminance-value calculating unit 13c obtains, using pixel data, a histogram of brightness; calculates pixel statistics (i.e., the average value of the brightness of an image); and notifies the image-state determining unit 13d, which will be described later.

The image-state determining unit 13d determines whether the calculated brightness of the image is brighter than a certain threshold. If the brightness of the image is brighter than the certain threshold, the image-state determining unit 13d determines whether an exposure level is greater than a certain threshold. Furthermore, if the brightness of the image is darker than the certain threshold, the image-state determining unit 13d determines whether the exposure level is greater than the certain threshold.

Specifically, the image-state determining unit 13d determines whether the average value of the brightness of the image is greater than a certain threshold. If the average value of the brightness of the image is lower than the certain threshold (i.e., in the case of a dark image), the image-state determining unit 13d determines whether the EV is greater than the certain threshold.

If the result of the determination is that the EV is lower than the certain threshold, the image-state determining unit 13d notifies the image correction unit 13e of a request for outputting an original image to the printer 30 without performing a correction process. Furthermore, if the EV is greater than the certain threshold, the image-state determining unit 13d determines whether the EV is equal to or greater than an intermediate value.

If the result of the determination is that the EV is equal to the intermediate value, the image-state determining unit 13d notifies the image correction unit 13e of a request for performing brightness conversion using a weak brightness conversion LUT that is used to perform weak brightness conversion (see FIG. 2A). Furthermore, if the EV is greater than the certain threshold, the image-state determining unit 13d notifies the image correction unit 13e of a request for performing the brightness conversion using a strong brightness conversion LUT that is used to perform strong brightness conversion (see FIG. 2B).

Figure 4A:
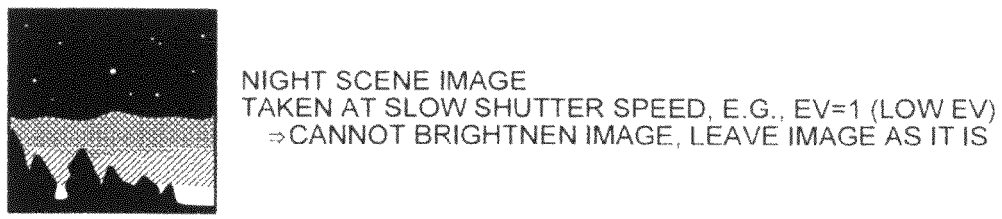
FIGS. 4A and 4B are schematic diagrams explaining a correction process performed on an image.
Figure 4B:
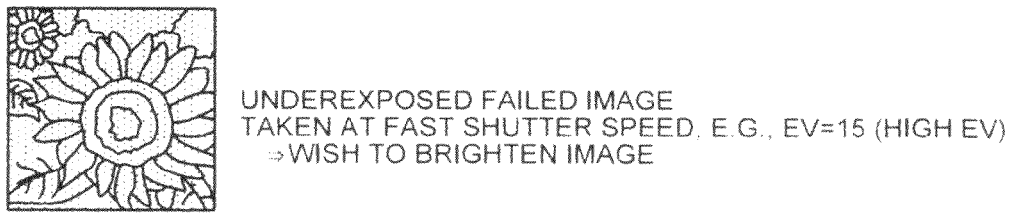

Specifically, as in the example illustrated in FIG. 4A, for an image in which the average value of the brightness of the image is lower than the certain threshold and the EV is lower than the certain threshold, the image-state determining unit 13d, by recognizing the image as a night scene image that is captured at a slow shutter speed (for example, "EV=1"), leaves the image as it is without performing the brightness conversion. In contrast, as in the example illustrated in FIG. 4B, for an image in which the average value of the brightness of the image is lower than the certain threshold and the EV is high (or intermediate), the image-state determining unit 13d, by recognizing the image as an underexposed failed image that is captured at a fast shutter speed (for example, "EV=15"), performs brightness conversion.

In contrast, if the average value of the brightness of the image is greater than the certain threshold (i.e., a case of a bright image), the image-state determining unit 13d determines whether the EV is greater than the certain threshold. If the result of the determination is that the EV is lower than the certain threshold, the image-state determining unit 13d notifies the image correction unit 13e of a request for performing darkness conversion using a darkness conversion LUT (see FIG. 2C). Furthermore, if the EV is greater than the certain threshold, the image-state determining unit 13d notifies the image correction unit 13e of a request for outputting the original image to the printer 30.

The image correction unit 13e corrects the brightness of image data in accordance with the exposure level and the brightness of an image. Specifically, if the image correction unit 13e receives, from the image-state determining unit 13d, a request for performing brightness conversion using a weak brightness conversion LUT (see FIG. 2A), which is used for weak brightness conversion, the image correction unit 13e reads, from the LUT 14a, the weak brightness conversion LUT; performs the brightness conversion using the weak brightness conversion LUT; and then outputs image data to the printer 30.

If the image correction unit 13e receives, from the image-state determining unit 13d, a request for performing brightness conversion using a strong brightness conversion LUT (see FIG. 2B), which is used for strong brightness conversion, the image correction unit 13e reads, from the LUT 14a, the strong brightness conversion LUT; performs the brightness conversion using the strong brightness conversion LUT; and then outputs the image data to the printer 30.

If the image correction unit 13e receives, from the image-state determining unit 13d, a request for performing darkness conversion using a darkness conversion LUT (see FIG. 2C), the image correction unit 13e reads, from the LUT 14a, the darkness conversion LUT; performs the darkness conversion using the darkness conversion LUT; and then outputs the image data to the printer 30.

If the image correction unit 13e receives, from the image-state determining unit 13d, a request for outputting the original image to the printer 30, the image correction unit 13e outputs the original image to the printer 30. For an image in which the average value of the image brightness is lower than the certain threshold and the EV is lower than the certain threshold and for an image in which the average value of the image brightness is greater than the certain threshold and the EV is greater than the certain threshold, instead of outputting the original image to the printer 30, the image correction unit 13e may perform weak brightness conversion or weak darkness conversion and then outputs the image to the printer 30.

Process performed by the image correction apparatus

Figure 5:
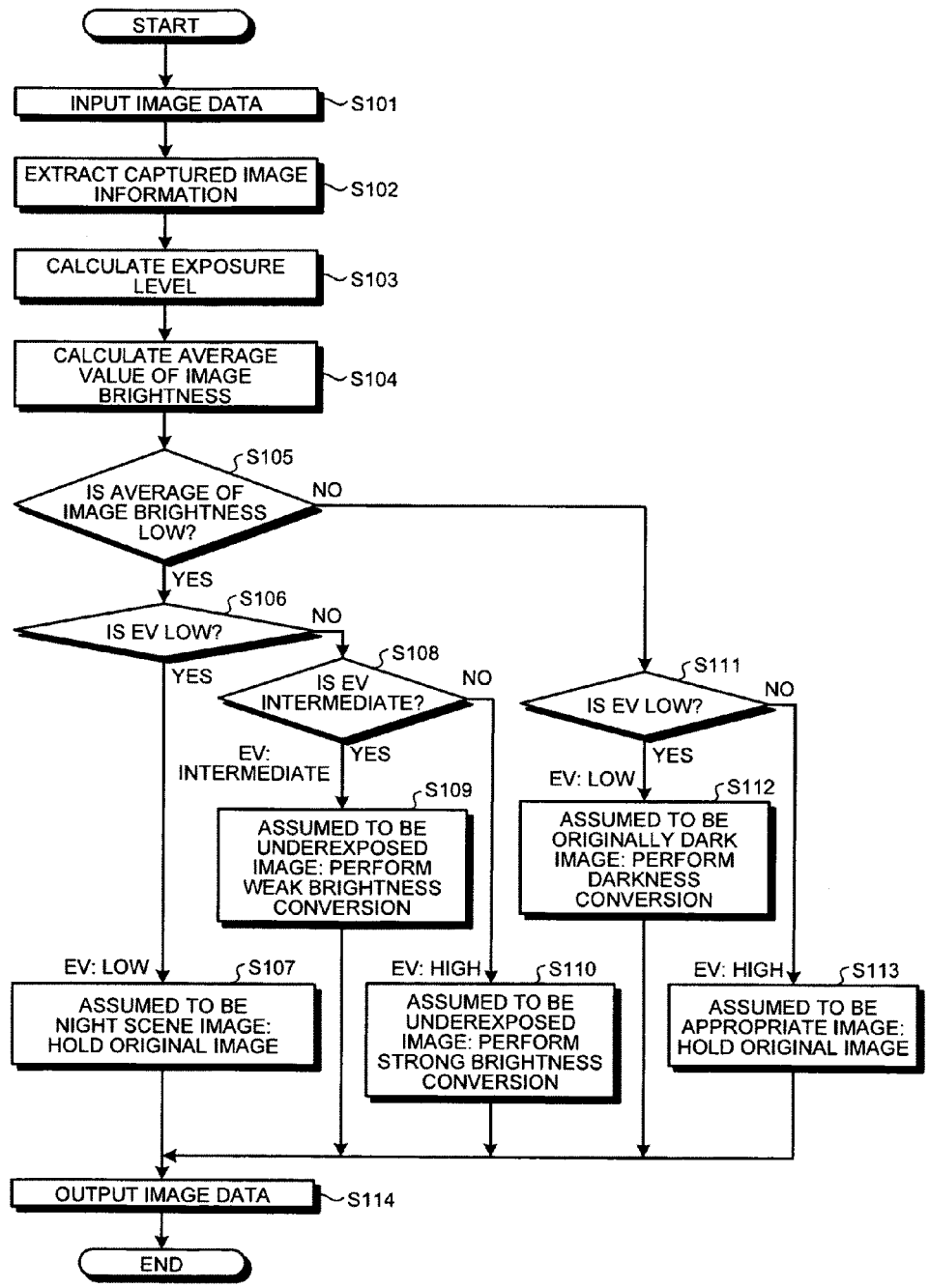
FIG. 5 is a flowchart explaining a process procedure performed by the image correction apparatus according to the first embodiment.

In the following, a process performed by the image correction apparatus 10 according to the first embodiment will be described with reference to FIG. 5. FIG. 5 is a flowchart illustrating the flow performed by the image correction apparatus 10 according to the first embodiment. As illustrated in FIG. 5, if the image correction apparatus 10 receives, from the digital camera 20, captured-image data (S101), the image correction apparatus 10 extracts, from the captured-image data, "Exif information" and "pixel data" (S102).

Then, the image correction apparatus 10 calculates the exposure level (EV) from the Exif information (S103); obtains, using the pixel data, a histogram of the brightness; and calculates pixel statistics (i.e., the average value of the brightness of an image) (S104).

Subsequently, the image correction apparatus 10 determines whether the average value of the brightness of the image is lower than the certain threshold (S105). If the result of the determination is that the average value of the brightness of the image is lower than the certain threshold (i.e., in the case of a dark image) (Yes at S105), the image correction apparatus 10 determines whether the EV is lower than the certain threshold (S106).

If the result of the determination is that the EV is lower than the certain threshold (Yes at S106), the image correction apparatus 10 holds the original image without performing a correction process (S107) and outputs it to the printer 30 (S114). If the EV is greater than the certain threshold (No at S106), the image correction apparatus 10 determines whether the EV is intermediate (S108).

If the result of the determination is that the EV is intermediate (Yes at S108), the image correction apparatus 10 performs brightness conversion using a weak brightness conversion LUT, which is used for weak brightness conversion (S109), and outputs the image to the printer 30 (S114). If the EV is greater than the certain threshold (No at S108), the image correction apparatus 10 performs the brightness conversion using a strong brightness conversion LUT, which is used for strong brightness conversion (S110), and outputs the image to the printer 30 (S114).

In contrast, if the average value of the brightness of the image is greater than the certain threshold (i.e., in the case of a bright image) (No at S105), the image correction apparatus 10 determines whether the EV is lower than the certain threshold (S111).

If the result of the determination is that the EV is lower than the certain threshold (Yes at S111), the image correction apparatus 10 performs darkness conversion using the darkness conversion LUT (S112) and output the image to the printer 30 (S114). If the EV is greater than the certain threshold (No at S111), the image correction apparatus 10 holds the original image without performing the correction process (S113) and outputs the image to the printer 30 (S114).

Advantage of the first embodiment

As described above, the image correction apparatus 10 calculates an exposure level using information (e.g., Exif information) on the digital camera 20 obtained when an image is captured; calculates the average value of brightness of the image using information (e.g., pixel data on the image) on the image data; and corrects the brightness of the image data on the basis of the exposure level and the average value of the brightness of the image. Accordingly, it is possible to presume what a captured-scene state is from the exposure level and the average value of the brightness of the image; therefore, it is possible to perform, on image data, a correction process in a precise manner in accordance with a captured-scene state.

Furthermore, according to the first embodiment, the image correction apparatus 10 determines whether the average value of the brightness of the image is lower than the certain threshold. If the average value of the brightness of the image is lower than the certain threshold, the image correction apparatus 10 determines whether the calculated exposure level is greater than the certain threshold. If it is determined that the exposure level is lower than the certain threshold, the image correction apparatus 10 does not perform a process for correcting the brightness of the image data. In contrast, if it is determined that the exposure level is greater than the certain threshold, the image correction apparatus 10 performs a brightness conversion process for brightening the image data as a process for correcting the brightness of the image data. Accordingly, for example, for an image in which the average value of the brightness of the image is lower than the certain threshold and the EV is lower than the certain threshold, the image correction apparatus 10 recognizes the image as a night scene image captured at a slow shutter speed and thus does not perform a process for correction, i.e., brightness conversion. Furthermore, for an image in which the average value of the brightness of the image is lower than the certain threshold and the EV is high, the image correction apparatus 10 recognizes the image as an underexposed failed image that is captured at a fast shutter speed and thus performs brightness conversion. Accordingly, it is possible to perform, on a bright image, a correction process in a precise manner in accordance with the captured-scene state.

Furthermore, according to the first embodiment, the image correction apparatus 10 determines whether the average value of the brightness of the image is lower than the certain threshold. If the average value of the brightness of the image is lower than the certain threshold, the image correction apparatus 10 determines whether the exposure level is greater than the certain threshold. If it is determined that the exposure level is lower than the certain threshold, the image correction apparatus 10 performs a brightness conversion process, which is weaker than the brightness conversion process that is performed when the exposure level is greater than the certain threshold. In contrast, if it is determined that the exposure level is greater than the certain threshold, the image correction apparatus 10 performs a brightness conversion process, which is stronger than the brightness conversion process that is performed when the exposure level is lower than the certain threshold. Accordingly, it is possible to perform, on a bright image, a correction process in a precise manner in accordance with a captured-scene state.

Furthermore, according to the first embodiment, the image correction apparatus 10 determines whether the calculated brightness of the image is higher than the certain threshold. If the brightness of the image is higher than the certain threshold, the image correction apparatus 10 determines whether the calculated exposure level is greater than the certain threshold. If it is determined that the exposure level is lower than the certain threshold, the image correction apparatus 10 performs, on the image data, darkness conversion in which the brightness of the image data is darkened. If it is determined that the exposure level is greater than the certain threshold, the image correction apparatus 10 does not perform a process for correcting the brightness of the image data. Accordingly, for example, for an image in which the average value of the brightness of the image is higher than the certain threshold and the EV is lower than the certain threshold, the image correction apparatus 10 performs darkness conversion assuming that the image of an originally dark scene captured at a slow shutter speed becomes a bright image. Furthermore, for an image in which the average value of the brightness of the image is higher than the certain threshold and the EV is greater than the certain threshold, the image correction apparatus 10, by recognizing the image as an appropriate image, does not perform darkness conversion. Accordingly, it is possible to perform, on a dark image, a correction process in a precise manner in accordance with the captured-scene state.

Furthermore, according to the first embodiment, the image correction apparatus 10 determines whether the calculated average value of the brightness of the image is darker than the certain threshold. If the brightness of the image is darker than the certain threshold, the image correction apparatus 10 determines whether the calculated exposure level is greater than the certain threshold. If it is determined that the exposure level is lower than the certain threshold, the image correction apparatus 10 performs a darkness conversion process, which is stronger than the darkness conversion process that is performed when the exposure level is greater than the certain threshold. If it is determined that the exposure level is greater than the certain threshold, the image correction apparatus 10 performs a darkness conversion process, which is weaker than the darkness conversion process that is performed when the exposure level is lower than the certain threshold. Accordingly, it is possible to perform, on a dark image, a correction process in a precise manner in accordance with the captured-scene state.

[b] Second Embodiment

The embodiment of the present invention has been described; however, the present invention is not limited to the embodiment described above and may be implemented with various kinds of embodiments other than the embodiments described above. Therefore, another embodiment included in the present invention will be described below as a second embodiment.

[b-1] Image correction

In the first embodiment, a case is described in which the image correction for brightness conversion or darkness conversion is performed by determining whether the exposure level and the brightness of the image is greater than each of the certain thresholds and then by using an LUT corresponding to the result of the determination; however, the present invention is not limited thereto. For example, image correction may be performed by changing the degree of darkness conversion or brightness conversion in accordance with the exposure level and the average value of the brightness of the image.

Specifically, if an average value of brightness of an image is lower than the certain threshold, an image correction apparatus according to the second embodiment performs stronger brightness conversion as the value of the exposure level increases and, conversely, performs weaker brightness conversion as the value of the exposure level decreases. If the average value of the brightness of the image is greater than the certain threshold, the image correction apparatus according to the second embodiment performs stronger darkness conversion as the value of the exposure level decreases and, conversely, performs weaker darkness conversion as the value of the exposure level increases.

Furthermore, when performing the brightness conversion, in accordance with the average value of the brightness of the image, the image correction apparatus according to the second embodiment may be adjusted such that it performs weaker brightness conversion as the average value of the brightness of the image increases and, conversely, performs stronger brightness conversion as the average value of the brightness of the image decreases. In contrast, when performing darkness conversion, the image correction apparatus according to the second embodiment may be adjusted such that it performs stronger darkness conversion as the average value of the brightness of the image increases and, conversely, performs weaker darkness conversion as the average value of the brightness of the image decreases.

[b-2] Digital camera

In the first embodiment described above, a case in which the digital camera sends image data to an external image correction apparatus and the image correction apparatus corrects the image data is described; however, the present invention is not limited thereto. For example, the image correction apparatus may be included in the digital camera, and a correction process may be performed on image data that is acquired by the digital camera itself.

[b-3] System configuration, etc.

The components of each device illustrated in the drawings are only for conceptually illustrating the functions thereof and are not necessarily physically configured as illustrated in the drawings. In other words, the specific shape of a separate or integrated device is not limited to the drawings; however, all or part of the device may be configured by functionally or physically separating or integrating any of the units depending on various loads or use conditions. For example, the image-state determining unit 13d may be integrated with the image correction unit 13e. Furthermore, all or a part of the processing functions performed by each unit may be implemented by a CPU and programs analyzed and executed by the CPU or may be implemented as hardware by wired logic.

Furthermore, of the processes described in the embodiments, the whole or a part of the processes that are mentioned as being automatically performed may be manually performed or the whole or a part of the processes that are mentioned as being manually performed may be automatically performed using known methods. Furthermore, process procedures, the control procedures, the specific names, and the information containing various kinds of data or parameters indicated in the above specification and drawings may be arbitrarily changed unless otherwise noted. For example, the certain threshold that is used to determine the above-described image state may be arbitrarily changed.

[b-4] Programs

Figure 6:
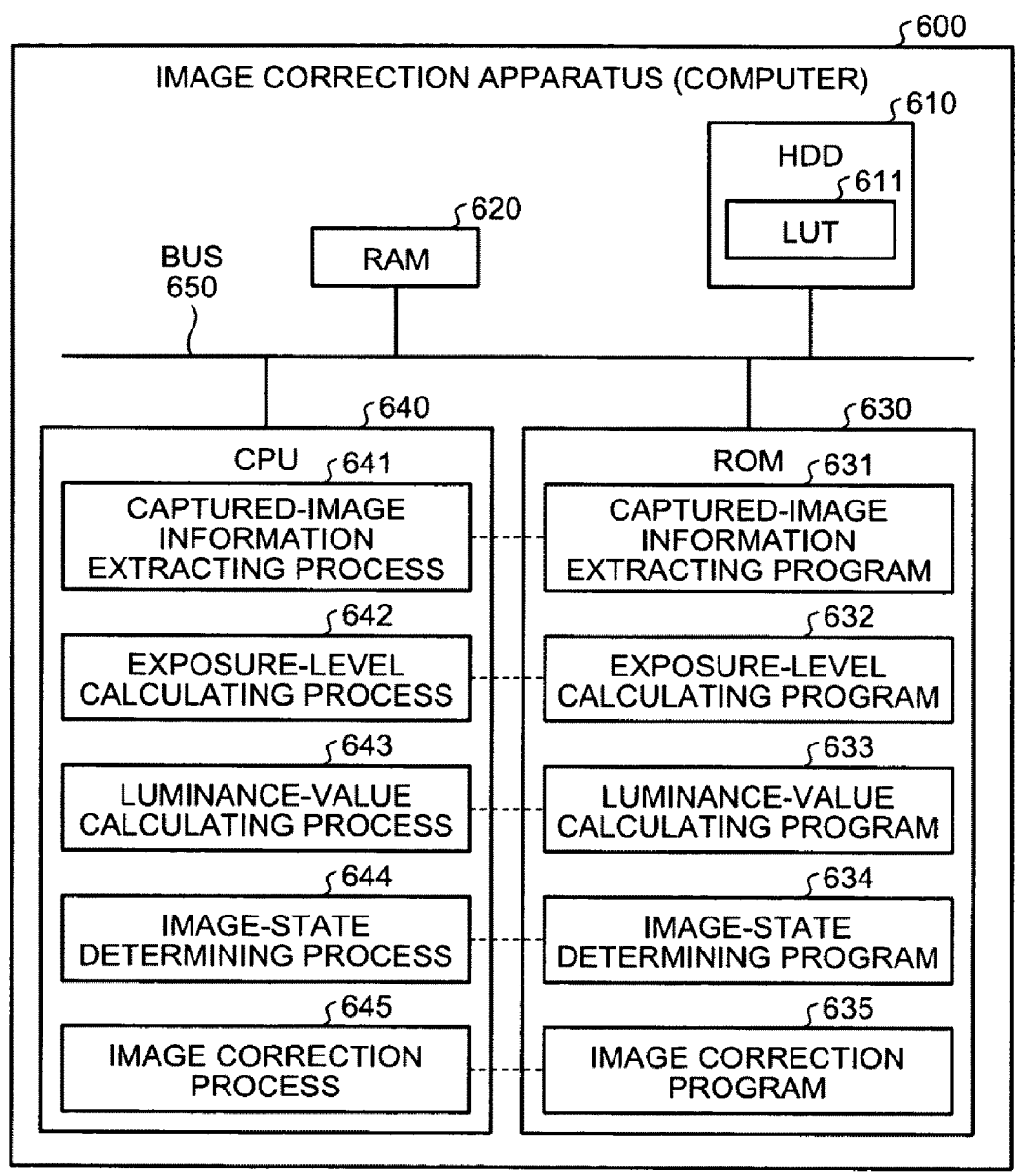
FIG. 6 is a block diagram illustrating a computer that executes an image correction program.

Various kinds of processes described in the above embodiment may be implemented by programs prepared in advance and executed by a computer. Accordingly, in the following, a computer that executes programs having the same function as those described in the embodiment described above will be described as an example with reference to FIG. 6. FIG. 6 is a block diagram illustrating a computer that executes an image correction program.

As illustrated in FIG. 6, a computer 600 serving as the image correction apparatus includes an HDD 610, a RAM 620, a ROM 630, and a CPU 640, which are connected via a bus 650.

The ROM 630 stores therein, in advance, an image correction program having the same functions as the above-described embodiment. Specifically, the ROM 630 stores therein, as illustrated in FIG. 6, a captured-image information extracting program 631, an exposure-level calculating program 632, a luminance-value calculating program 633, an image-state determining program 634, and an image correction program 635. These programs 631 to 635 may appropriately be integrated of separated in the same manner as the components of the image correction apparatus illustrated in FIG. 1.

As illustrated in FIG. 6, because the CPU 640 reads these programs 631 to 635 from the ROM 630 and executes them, these programs 631 to 635 function as a captured-image information extracting process 641, an exposure-level calculating process 642, a luminance-value calculating process 643, an image-state determining process 644, and an image correction process 645, respectively. These processes 641 to 645 correspond to the captured-image information extracting unit 13a, the exposure-level calculating unit 13b, the luminance-value calculating unit 13c, the image-state determining unit 13d, and the image correction unit 13e, respectively, illustrated in FIG. 1.

As illustrated in FIG. 6, the HDD 610 includes an LUT 611 that corresponds to the LUT 14a illustrated in FIG. 1. The CPU 640 executes the image correction process using the LUT 611.

According to an aspect of the present invention, with the disclosed apparatus, an advantage is provided in that it is possible to perform a correction process on image data in a precise manner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory computer readable storage medium having stored therein an image correction program, the image correction program causing a computer to execute a process comprising:

firstly calculating an exposure level using information on an image capturing unit, which captures image data, at the time of capture of an image;

secondly calculating brightness of the image using information on the image data captured by the image capturing unit;

correcting the brightness of the image data in accordance with the exposure level calculated in the firstly calculating and the brightness of the image calculated in the secondly calculating; and determining whether the brightness of the image calculated in the secondly calculating is brighter than a certain brightness threshold and determines, if the brightness of the image is lower than the certain brightness threshold, whether the exposure level calculated in the firstly calculating is greater than a certain exposure level threshold, wherein if it is determined in the determining that the exposure level is lower than the certain exposure level threshold, a process for correcting the brightness of the image data is not performed in the correcting, and, if it is determined in the determining that the exposure level is greater than the certain exposure level threshold, a brightness conversion process for brightening the image data is performed in the correcting as a process for correcting the brightness of the image data.

2. The non-transitory computer readable storage medium according to claim 1, wherein the process further comprises determining whether the brightness of the image calculated in the secondly calculating is brighter than a certain brightness threshold and determining, if the brightness of the image is lower than the certain brightness threshold, whether the exposure level calculated in the firstly calculating is greater than a certain exposure level threshold, wherein if it is determined in the determining that the exposure level is lower than the certain exposure level threshold, a brightness conversion process that is weaker than a brightness conversion process that is performed when the exposure level is greater than the certain exposure level threshold is not performed in the correcting, and, if it is determined in the determining that the exposure level is greater than the certain exposure level threshold, a brightness conversion process that is stronger than a brightness conversion process that is performed when the exposure level is lower than the certain exposure level threshold is performed in the correcting.

3. The non-transitory computer readable storage medium according to claim 1, wherein the determining includes determining whether the brightness of the image calculated in the secondly calculating is darker than the certain brightness threshold, and determining, if the brightness of the image is brighter than the certain brightness threshold, whether the exposure level calculated in the firstly calculating is greater than the certain exposure level threshold, and if it is determined in the determining that the exposure level is lower than the certain exposure level threshold, a darkness conversion process to darken the image data is performed in the correcting as a process for correcting the brightness of the image data, and, if it is determined in the determining that the exposure level is greater than the certain exposure level threshold, the process for correcting the brightness of the image data is not performed in the correcting.

4. The non-transitory computer readable storage medium according to claim 1, wherein the determining includes determining whether the brightness of the image calculated in the secondly calculating is darker than the certain brightness threshold, and determining, if the brightness of the image is darker than the certain brightness threshold, whether the exposure level calculated in the firstly calculating is greater than the certain exposure level threshold, and if it is determined in the determining that the exposure level is lower than the certain exposure level threshold, a darkness conversion process that is stronger than a darkness conversion process that is performed when the exposure level is greater than the certain exposure level threshold is performed in the correcting, and, if it is determined in the determining that the exposure level is greater than the certain exposure level threshold, a darkness conversion process that is weaker than a darkness conversion process that is performed when the exposure level is lower than the certain exposure level threshold is performed in the correcting.

5. An image correction apparatus comprising:

an exposure-level calculating unit that calculates an exposure level using information on an image capturing unit, which captures image data, at the time of capture of an image;

a brightness calculating unit that calculates brightness of the image using information on the image data captured by the image capturing unit;

an image correction unit that corrects the brightness of the image data in accordance with the exposure level calculated by the exposure-level calculating unit and the brightness of the image calculated by the brightness calculating unit; and an image determining unit that determines whether the brightness of the image calculated by the brightness calculating unit is brighter than a certain brightness threshold and determines, if the brightness of the image is lower than the certain brightness threshold, whether the exposure level calculated by the exposure-level calculating unit is greater than a certain exposure level threshold, wherein if the image determining unit determines that the exposure level is lower than the certain exposure level threshold, the image correction unit does not perform a process for correcting the brightness of the image data, and, if the image determining unit determines that the exposure level is greater than the certain exposure level threshold, the image correction unit performs a brightness conversion process for brightening the image data as a process for correcting the brightness of the image data.

6. The image correction apparatus according to claim 5, further comprising an image determining unit that determines whether the brightness of the image calculated by the brightness calculating unit is brighter than a certain brightness threshold and determines, if the brightness of the image is lower than the certain brightness threshold, whether the exposure level calculated by the exposure-level calculating unit is greater than a certain exposure level threshold, wherein if the image determining unit determines that the exposure level is lower than the certain exposure level threshold, the image correction unit performs a brightness conversion process that is weaker than a brightness conversion process that is performed when the exposure level is greater than the certain exposure level threshold, and, if the image determining unit determines that the exposure level is greater than the certain exposure level threshold, the image correction unit performs a brightness conversion process that is stronger than a brightness conversion process that is performed when the exposure level is lower than the certain exposure level threshold.

7. The image correction apparatus according to claim 5, wherein the image determining unit determines whether the brightness of the image calculated by the brightness calculating unit is darker than the certain brightness threshold, and determines, if the brightness of the image is brighter than the certain brightness threshold, whether the exposure level calculated by the exposure-level calculating unit is greater than the certain exposure level threshold, and if the image determining unit determines that the exposure level is lower than the certain exposure level threshold, the image correction unit performs a darkness conversion process to darken the image data as a process for correcting the brightness of the image data, and, if the image determining unit determines that the exposure level is greater than the certain exposure level threshold, the image correction unit does not perform the process for correcting the brightness of the image data.

8. The image correction apparatus according to claim 5, wherein the image determining unit determines whether the brightness of the image calculated by the brightness calculating unit is darker than the certain brightness threshold, and determines, if the brightness of the image is darker than the certain brightness threshold, whether the exposure level calculated by the exposure-level calculating unit is greater than the certain exposure level threshold, and if the image determining unit determines that the exposure level is lower than the certain exposure level threshold, the image correction unit performs a darkness conversion process that is stronger than a darkness conversion process that is performed when the exposure level is greater than the certain exposure level threshold, and, if the image determining unit determines that the exposure level is greater than the certain exposure level threshold, the image correction unit performs a darkness conversion process that is weaker than a darkness conversion process that is performed when the exposure level is lower than the certain exposure level threshold.

9. An image correction method comprising:

firstly calculating an exposure level using information on an image capturing unit at the time of capture of an image;

secondly calculating brightness of the image using information on image data captured by the image capturing unit;

correcting the brightness of the image data in accordance with the exposure level calculated in the firstly calculating and the brightness of the image calculated in the secondly calculating; and determining whether the brightness of the image calculated in the secondly calculating is brighter than a certain brightness threshold and determining, if the brightness of the image is lower than the certain brightness threshold, whether the exposure level calculated in the firstly calculating is greater than a certain exposure level threshold, wherein if it is determined in the determining that the exposure level is lower than the certain exposure level threshold, a process for correcting the brightness of the image data is not performed in the correcting, and, if it is determined in the determining that the exposure level is greater than the certain exposure level threshold, a brightness conversion process for brightening the image data is performed in the correcting as a process for correcting the brightness of the image data.

10. The image correction method according to claim 9, further comprising determining whether the brightness of the image calculated in the secondly calculating is brighter than a certain brightness threshold and determining, if the brightness of the image is lower than the certain brightness threshold, whether the exposure level calculated in the firstly calculating is greater than a certain exposure level threshold, wherein if it is determined in the determining that the exposure level is lower than the certain exposure level threshold, a brightness conversion process that is weaker than a brightness conversion process that is performed when the exposure level is greater than the certain exposure level threshold is not performed in the correcting, and, if it is determined in the determining that the exposure level is greater than the certain exposure level threshold, a brightness conversion process that is stronger than a brightness conversion process that is performed when the exposure level is lower than the certain exposure level threshold is performed in the correcting.

11. The image correction method according to claim 9, wherein the determining includes determining whether the brightness of the image calculated in the secondly calculating is darker than the certain brightness threshold, and determining, if the brightness of the image is brighter than the certain brightness threshold, whether the exposure level calculated in the firstly calculating is greater than the certain exposure level threshold, and if it is determined in the determining that the exposure level is lower than the certain exposure level threshold, a darkness conversion process to darken the image data is performed in the correcting as a process for correcting the brightness of the image data, and, if it is determined in the determining that the exposure level is greater than the certain exposure level threshold, the process for correcting the brightness of the image data is not performed in the correcting.

12. The image correction method according to claim 9, wherein the determining includes determining whether the brightness of the image calculated in the secondly calculating is darker than the certain brightness threshold, and determining, if the brightness of the image is darker than the certain brightness threshold, whether the exposure level calculated in the firstly calculating is greater than the certain exposure level threshold, and if it is determined in the determining that the exposure level is lower than the certain exposure level threshold, a darkness conversion process that is stronger than a darkness conversion process that is performed when the exposure level is greater than the certain exposure level threshold is performed in the correcting, and, if it is determined in the determining that the exposure level is greater than the certain exposure level threshold, a darkness conversion process that is weaker than a darkness conversion process that is performed when the exposure level is lower than the certain exposure level threshold is performed in the correcting.

* * * * *